(12) United States Patent
Pervan

(10) Patent No.: US 10,307,984 B2
(45) Date of Patent: Jun. 4, 2019

(54) COMPOSITE BOARDS AND PANELS

(71) Applicant: CERALOC INNOVATION AB, Viken (SE)

(72) Inventor: Darko Pervan, Viken (SE)

(73) Assignee: CERALOC INNOVATION AB, Viken (SE)

( * ) Notice: Subject to any disclaimer, the term of this patent is extended or adjusted under 35 U.S.C. 154(b) by 0 days.

(21) Appl. No.: 15/404,546

(22) Filed: Jan. 12, 2017

(65) Prior Publication Data

US 2017/0120558 A1 May 4, 2017

Related U.S. Application Data

(62) Division of application No. 14/672,610, filed on Mar. 30, 2015, now Pat. No. 9,573,343.

(30) Foreign Application Priority Data

Mar. 31, 2014 (SE) ...................... 1450382

(51) Int. Cl.
*B32B 5/30* (2006.01)
*B32B 37/04* (2006.01)
(Continued)

(52) U.S. Cl.
CPC .................. *B32B 5/30* (2013.01); *B32B 3/06* (2013.01); *B32B 27/08* (2013.01); *B32B 27/20* (2013.01);
(Continued)

(58) Field of Classification Search
CPC ....... B32B 5/30; B32B 27/32; B32B 37/0007; B32B 27/20; B32B 27/304; B32B 27/08;
(Continued)

(56) References Cited

U.S. PATENT DOCUMENTS 1,939,045 A * 12/1933 Fredriksen .............. B29C 43/20
106/242
2,572,068 A * 10/1951 Sommer ................. B01F 7/022
106/280

(Continued)

FOREIGN PATENT DOCUMENTS

| CH | 298894 A | 5/1954 |
|---|---|---|
| DE | 7148789 U | 4/1972 |

(Continued)

OTHER PUBLICATIONS

U.S. Appl. No. 12/270,257, Darko Pervan, Kent, filed Nov. 13, 2008, (cited herein as US Patent Application Publication No. 2009/0155612 A1 of Jun. 18, 2009).

(Continued)

*Primary Examiner* — Jeanette E Chapman
(74) *Attorney, Agent, or Firm* — Buchanan Ingersoll & Rooney P.C.

(57) ABSTRACT

A building panel (1) including a water resistant core (5) including thermoplastic material 21 and a surface layer (4) including thermosetting resins. Also, production methods to form a board material (1') with a dry blend of thermoplastic particles 21a in powder form and fillers in powder form and to apply a surface layer (4) with a hot-hot lamination process to a core (5) including such board material.

25 Claims, 4 Drawing Sheets

(51) Int. Cl.

| | | |
|---|---|---|
| *B32B 37/10* | (2006.01) | |
| *B32B 3/06* | (2006.01) | |
| *E04F 13/08* | (2006.01) | |
| *E04F 15/02* | (2006.01) | |
| *C08L 27/06* | (2006.01) | |
| *C08L 97/02* | (2006.01) | |
| *B32B 27/08* | (2006.01) | |
| *B32B 27/20* | (2006.01) | |
| *B32B 27/42* | (2006.01) | |
| *B32B 37/00* | (2006.01) | |
| *B32B 37/24* | (2006.01) | |
| *B44C 5/04* | (2006.01) | |
| *E04F 15/10* | (2006.01) | |
| *B32B 37/14* | (2006.01) | |
| *B32B 27/30* | (2006.01) | |
| *B32B 27/32* | (2006.01) | |
| *B32B 37/06* | (2006.01) | |
| *B32B 37/08* | (2006.01) | |
| *B32B 37/20* | (2006.01) | |
| *B32B 38/00* | (2006.01) | |

(52) U.S. Cl.
CPC ............ *B32B 27/304* (2013.01); *B32B 27/32* (2013.01); *B32B 27/42* (2013.01); *B32B 37/0007* (2013.01); *B32B 37/04* (2013.01); *B32B 37/10* (2013.01); *B32B 37/1027* (2013.01); *B32B 37/144* (2013.01); *B32B 37/24* (2013.01); *B44C 5/04* (2013.01); *C08L 27/06* (2013.01); *C08L 97/02* (2013.01); *E04F 13/0894* (2013.01); *E04F 15/02038* (2013.01); *E04F 15/102* (2013.01); *E04F 15/107* (2013.01); *B32B 37/06* (2013.01); *B32B 37/08* (2013.01); *B32B 37/20* (2013.01); *B32B 2037/243* (2013.01); *B32B 2038/0076* (2013.01); *B32B 2262/062* (2013.01); *B32B 2264/0257* (2013.01); *B32B 2264/067* (2013.01); *B32B 2264/102* (2013.01); *B32B 2264/104* (2013.01); *B32B 2307/4026* (2013.01); *B32B 2307/412* (2013.01); *B32B 2311/24* (2013.01); *B32B 2317/16* (2013.01); *B32B 2379/00* (2013.01); *B32B 2419/04* (2013.01); *B32B 2471/00* (2013.01); *B32B 2479/00* (2013.01); *B32B 2607/00* (2013.01); *E04F 2201/0153* (2013.01); *E04F 2201/042* (2013.01); *E04F 2201/043* (2013.01); *Y10T 428/24397* (2015.01); *Y10T 428/253* (2015.01); *Y10T 428/254* (2015.01); *Y10T 428/31899* (2015.04)

(58) Field of Classification Search
CPC ....... B32B 37/1027; B32B 37/24; B32B 3/06; B32B 37/10; B32B 37/04; B32B 37/06; B32B 2264/102; B32B 2262/062; B32B 2307/412; B32B 37/08; B32B 2264/067; B32B 2419/04; B32B 2471/00; B32B 2479/00; B32B 2607/00; B32B 2307/4026; B32B 2307/243; B32B 2311/24; B32B 2379/00; B32B 2264/104; B32B 2317/16; B32B 2264/0257; B32B 27/42; E04F 15/102; E04F 15/107; E04F 13/0894; E04F 15/02038; E04F 2201/043; E04F 2201/042; B44C 5/04; C08L 97/02; C08L 27/06; Y10T 428/31899; Y10T 428/254; Y10T 428/253; Y10T 428/24397
See application file for complete search history.

(56) References Cited

U.S. PATENT DOCUMENTS

| | | | |
|---|---|---|---|
| 2,831,793 A | 4/1958 | Elmendorf | |
| 2,831,794 A | 4/1958 | Elmendorf | |
| 2,953,187 A | 9/1960 | Francis, Jr. | |
| 3,032,820 A | 5/1962 | Johnson | |
| 3,286,006 A | 11/1966 | Annand | |
| 3,308,013 A | 3/1967 | Bryant | |
| 3,373,070 A | 3/1968 | Fuerst | |
| 3,381,067 A | 4/1968 | Kemmler | |
| 3,440,189 A * | 4/1969 | Sharp | B27N 3/00 156/62.2 |
| 3,515,619 A * | 6/1970 | Barnette | B29C 39/026 264/316 |
| 3,673,020 A | 6/1972 | De Jaeger | |
| 3,793,125 A | 2/1974 | Kunz | |
| 3,846,219 A | 11/1974 | Kunz | |
| 3,897,185 A | 7/1975 | Beyer | |
| 3,954,555 A | 5/1976 | Kole et al. | |
| 4,093,766 A | 6/1978 | Scher et al. | |
| 4,131,705 A | 12/1978 | Kubinsky | |
| 4,228,116 A * | 10/1980 | Colombo | A01D 34/30 264/119 |
| 4,305,901 A | 12/1981 | Prince et al. | |
| 4,311,621 A | 1/1982 | Nishizawa et al. | |
| 4,313,857 A | 2/1982 | Blount | |
| 4,337,290 A | 6/1982 | Kelly et al. | |
| 4,430,375 A | 2/1984 | Scher et al. | |
| 4,890,656 A | 1/1990 | Ohsumi et al. | |
| 5,034,272 A | 7/1991 | Lindgren et al. | |
| 5,085,930 A | 2/1992 | Widmann et al. | |
| 5,258,216 A | 11/1993 | Von Bonin et al. | |
| 5,422,170 A | 6/1995 | Iwata et al. | |
| 5,480,602 A | 1/1996 | Nagaich | |
| 5,855,832 A | 1/1999 | Clausi | |
| 5,891,564 A | 4/1999 | Shultz et al. | |
| 5,981,631 A | 11/1999 | Ronden et al. | |
| 6,101,778 A | 8/2000 | Martensson | |
| 6,103,377 A | 8/2000 | Clausi | |
| 6,253,527 B1 * | 7/2001 | De Zen | B09B 3/0033 264/343 |
| 6,468,645 B1 | 10/2002 | Clausi | |
| 6,536,178 B1 * | 3/2003 | Pålsson | B44C 3/123 52/392 |
| 6,729,807 B1 | 5/2004 | Spittle | |
| 6,773,799 B1 | 8/2004 | Persson et al. | |
| 6,789,217 B2 | 8/2004 | Nelson | |
| 6,803,110 B2 | 10/2004 | Drees et al. | |
| 6,926,954 B2 | 8/2005 | Schuren et al. | |
| 8,419,877 B2 | 4/2013 | Pervan et al. | |
| 8,431,054 B2 | 4/2013 | Pervan et al. | |
| 8,544,233 B2 | 10/2013 | Palsson et al. | |
| 9,120,976 B2 | 9/2015 | Stadter | |
| 9,225,405 B2 | 12/2015 | Li et al. | |
| 9,556,622 B2 | 1/2017 | Pervan et al. | |
| 9,573,343 B2 | 2/2017 | Pervan | |
| 9,783,996 B2 | 10/2017 | Pervan et al. | |
| 2001/0034991 A1 | 11/2001 | Martensson | |
| 2002/0034629 A1 * | 3/2002 | Jones | B27N 1/0227 428/326 |
| 2002/0110682 A1 * | 8/2002 | Brogan | B29C 70/64 428/325 |
| 2002/0127392 A1 | 9/2002 | Vaders | |
| 2003/0008130 A1 | 1/2003 | Kaneko | |
| 2003/0111775 A1 * | 6/2003 | Ukai | B27N 1/0263 264/555 |
| 2004/0086678 A1 | 5/2004 | Chen et al. | |
| 2004/0191547 A1 | 9/2004 | Oldorff | |
| 2004/0206036 A1 | 10/2004 | Pervan | |
| 2005/0008766 A1 | 1/2005 | Sakurada | |
| 2005/0208255 A1 | 9/2005 | Pervan | |
| 2005/0227040 A1 | 10/2005 | Toupalik | |
| 2005/0252130 A1 | 11/2005 | Martensson | |
| 2006/0005498 A1 | 1/2006 | Sabater et al. | |
| 2006/0024465 A1 | 2/2006 | Briere | |
| 2006/0036004 A1 | 2/2006 | Wu et al. | |

(56) References Cited

U.S. PATENT DOCUMENTS

| | | | |
|---|---|---|---|
| 2006/0048474 | A1 | 3/2006 | Pervan et al. |
| 2006/0070321 | A1 | 4/2006 | Au |
| 2006/0099405 | A1 | 5/2006 | Guiselin |
| 2006/0156672 | A1 | 7/2006 | Laurent |
| 2006/0179733 | A1* | 8/2006 | Padmanabhan ........ B32B 21/08 52/177 |
| 2006/0182938 | A1 | 8/2006 | Oldorff |
| 2006/0183853 | A1 | 8/2006 | Sczepan |
| 2007/0184244 | A1 | 8/2007 | Doehring |
| 2007/0207296 | A1 | 9/2007 | Eisermann |
| 2007/0224438 | A1 | 9/2007 | Van Benthem et al. |
| 2008/0032120 | A1 | 2/2008 | Braun |
| 2008/0263985 | A1 | 10/2008 | Hasch et al. |
| 2009/0155612 | A1 | 6/2009 | Pervan et al. |
| 2009/0264560 | A1 | 10/2009 | Warnes et al. |
| 2009/0294037 | A1 | 12/2009 | Oldorff |
| 2010/0055420 | A1* | 3/2010 | Vermeulen ............... B27N 3/06 428/207 |
| 2010/0092731 | A1 | 4/2010 | Pervan et al. |
| 2010/0239820 | A1 | 9/2010 | Buhlmann |
| 2010/0300030 | A1* | 12/2010 | Pervan .................... B32B 21/02 52/588.1 |
| 2010/0310810 | A1 | 12/2010 | Bond |
| 2010/0323187 | A1* | 12/2010 | Kalwa .................... B32B 33/00 428/325 |
| 2011/0250404 | A1 | 10/2011 | Pervan et al. |
| 2011/0300392 | A1* | 12/2011 | Vermeulen ............. E04F 15/02 428/513 |
| 2012/0094093 | A1* | 4/2012 | Nilsson .................... B27N 3/14 428/212 |
| 2012/0172494 | A1 | 7/2012 | Warnes et al. |
| 2012/0276348 | A1 | 11/2012 | Clausi et al. |
| 2012/0301727 | A1 | 11/2012 | Kim et al. |
| 2013/0025965 | A1 | 1/2013 | Miyake et al. |
| 2013/0133506 | A1 | 7/2013 | Vermeulen et al. |
| 2013/0189534 | A1 | 7/2013 | Pervan et al. |
| 2013/0273244 | A1* | 10/2013 | Vetter ....................... E04B 1/00 427/201 |
| 2013/0276772 | A1* | 10/2013 | Ota .......................... B32B 27/18 126/263.05 |
| 2014/0007526 | A1* | 1/2014 | Wright .............. E04F 15/02183 52/127.4 |
| 2014/0044872 | A1 | 2/2014 | Pervan |
| 2014/0178630 | A1 | 6/2014 | Pervan et al. |
| 2014/0242342 | A1* | 8/2014 | Vandevoorde .... E04F 15/02038 428/157 |
| 2014/0370319 | A1 | 12/2014 | Vetter et al. |
| 2015/0343739 | A1 | 12/2015 | Pervan |
| 2016/0114495 | A1 | 4/2016 | Pervan et al. |
| 2016/0136913 | A1 | 5/2016 | Hannig |
| 2018/0002934 | A1 | 1/2018 | Pervan et al. |

FOREIGN PATENT DOCUMENTS

| | | | |
|---|---|---|---|
| DE | 33 34 921 | A1 | 4/1985 |
| DE | 202 14 532 | U1 | 2/2004 |
| DE | 20 2004 003 061 | U1 | 7/2005 |
| DE | 20 2006 007 797 | U1 | 8/2006 |
| DE | 10 2005 046 264 | A1 | 4/2007 |
| DE | 10 2006 024 593 | A1 | 12/2007 |
| EP | 0 129 430 | A2 | 12/1984 |
| EP | 0 129 430 | B1 | 1/1990 |
| EP | 0 732 449 | B1 | 8/1991 |
| EP | 0 737 449 | A1 | 9/1996 |
| EP | 0 744 477 | A2 | 11/1996 |
| EP | 0 914 914 | A2 | 5/1999 |
| EP | 0 744 477 | B1 | 1/2000 |
| EP | 1 209 199 | A1 | 5/2002 |
| EP | 1 454 763 | A2 | 9/2004 |
| EP | 1 507 664 | A1 | 2/2005 |
| EP | 1 507 664 | B1 | 2/2005 |
| EP | 1 584 378 | A1 | 10/2005 |
| EP | 1 591 214 | A1 | 11/2005 |
| EP | 1 681 103 | A2 | 7/2006 |
| EP | 1 690 603 | A1 | 8/2006 |
| EP | 1 721 715 | A1 | 11/2006 |
| EP | 1 847 385 | A1 | 10/2007 |
| EP | 1 961 556 | A1 | 8/2008 |
| EP | 1 985 464 | A1 | 10/2008 |
| EP | 1 997 623 | A1 | 12/2008 |
| EP | 2 025 484 | A1 | 2/2009 |
| EP | 1 454 763 | B1 | 8/2009 |
| EP | 2 105 320 | A1 | 9/2009 |
| EP | 1 721 715 | B1 | 8/2010 |
| EP | 2 246 500 | A2 | 11/2010 |
| EP | 2 305 462 | A1 | 4/2011 |
| EP | 1 847 385 | B1 | 9/2011 |
| EP | 2 402 155 | A1 | 1/2012 |
| EP | 2 772 352 | A1 | 9/2014 |
| EP | 2 829 415 | A1 | 1/2015 |
| FR | 1 075 296 | A | 10/1954 |
| GB | 730 911 | A | 6/1955 |
| GB | 984 170 | A | 2/1965 |
| JP | 05220878 | A * | 8/1993 |
| JP | 11-291203 | A | 10/1999 |
| KR | 10-0721686 | B1 | 5/2007 |
| KR | 721686 | B1 * | 5/2007 |
| NZ | 225556 | A1 | 2/1992 |
| WO | WO 96/27721 | A1 | 9/1996 |
| WO | WO 00/22225 | A1 | 4/2000 |
| WO | WO 01/64408 | A1 | 9/2001 |
| WO | WO 01/66323 | A1 | 9/2001 |
| WO | WO 03/095202 | A1 | 11/2003 |
| WO | WO 2004/042168 | A1 | 5/2004 |
| WO | WO 2005/010296 | A1 | 2/2005 |
| WO | WO 2005/054600 | A1 | 6/2005 |
| WO | WO 2005/080096 | A2 | 9/2005 |
| WO | WO 2005/116361 | A1 | 12/2005 |
| WO | WO 2006/015313 | A2 | 2/2006 |
| WO | WO 2006/043893 | A1 | 4/2006 |
| WO | WO 2006/126930 | A1 | 11/2006 |
| WO | WO 2007/073218 | A1 | 6/2007 |
| WO | WO 2008/122668 | A1 | 10/2008 |
| WO | WO 2008/148771 | A1 | 12/2008 |
| WO | WO 2009/065768 | A1 | 5/2009 |
| WO | WO 2009/065769 | A2 | 5/2009 |
| WO | WO 2009/065769 | A3 | 5/2009 |
| WO | WO 2011/002314 | A1 | 1/2011 |
| WO | WO 2011/063967 | A1 | 6/2011 |
| WO | WO 2011/0082491 | A1 | 7/2011 |
| WO | WO 2011/102615 | A2 | 8/2011 |
| WO | WO 2011/102615 | A3 | 8/2011 |
| WO | WO 2011/111608 | A1 | 9/2011 |
| WO | WO 2011/129757 | A1 | 10/2011 |
| WO | WO 2012/046051 | A1 | 4/2012 |
| WO | WO 2012/053036 | A1 | 4/2012 |
| WO | WO 2013/157156 | A1 | 10/2013 |
| WO | WO 2015/011049 | A1 | 1/2015 |

OTHER PUBLICATIONS

U.S. Appl. No. 14/980,638, Darko Pervan, filed Dec. 28, 2015, (cited herein as US Patent Application Publication No. 2016/0114495 A1 of Apr. 28, 2016).

International Search Report dated Jun. 18, 2015 in PCT/SE2015/050380, ISA/SE, Patent-och registreringsverket, Stockholm, SE, 5 pages.

Floor Daily, "Shaw Laminates; Green by Design," Aug. 13, 2007, 1 pg, Dalton, GA.

Le Fur, X., et al., "Recycling melamine-impregnated paper waste as board adhesives," published online Oct. 26, 2004, pp. 419-423, vol. 62, Springer-Verlag, DE.

Engstrand, Ola (Contact)/Valinge Innovation, Technical Disclosure entitled "Fibre Based Panels Wth a Wear Resistance Surface," Nov. 17, 2008, IP.com No. IPCOM000176590D, IP.com PriorArtDatabase, 76 pages.

Engstrand, Ola (Contact)/Valinge Innovation, Technical Disclosure entitled "WFF Embossing," May 15, 2009, IP.com No. IPCOM000183105D, IP.com PriorArtDatabase, 36 pages.

Extended European Search Report dated EP 15773879.0, dated Oct. 26, 2017, EPO, Munich, DE, 5 pages.

(56) References Cited

OTHER PUBLICATIONS

U.S. Appl. No. 15/704,634, Darko Pervan, filed Sep. 14, 2017, (cited herein as US Patent Application Publication No. 2018/0002934 A1 of Jan. 4, 2018.

* cited by examiner

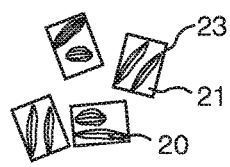
Fig. 2a
Fig. 2b
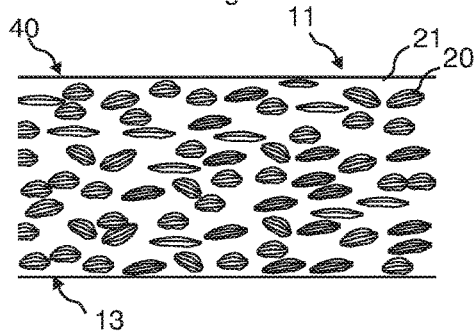
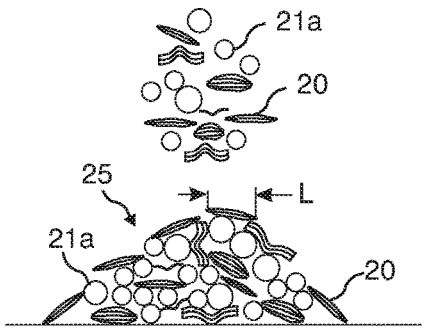
Fig. 2c
Fig. 2d
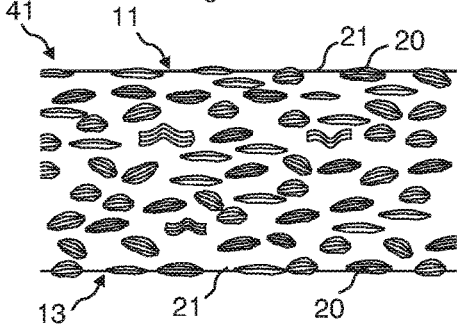
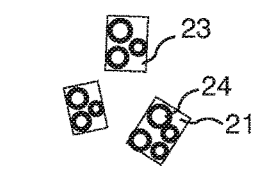
Fig. 2e
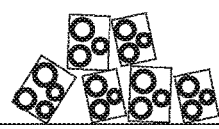
Fig. 2f
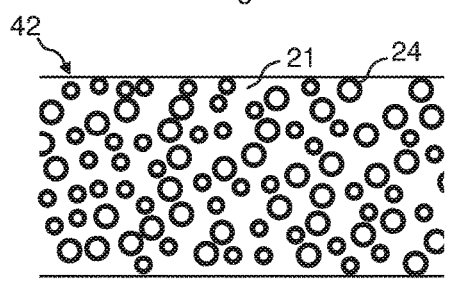
Fig. 2g
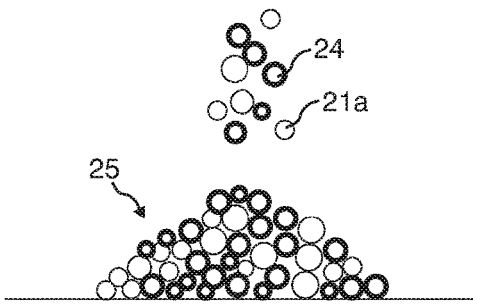
Fig. 2h
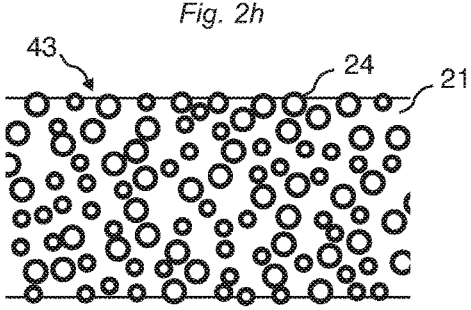

COMPOSITE BOARDS AND PANELS

CROSS REFERENCE TO RELATED APPLICATIONS

The present application is a divisional of U.S. application Ser. No. 14/672,610, filed on Mar. 30, 2015, which claims the benefit of Swedish Application No. 1450382-5, filed on Mar. 31, 2014. The entire contents of U.S. application Ser. No. 14/672,610 and Swedish Application No. 1450382-5 are hereby incorporated herein by reference in their entirety.

TECHNICAL FIELD

The disclosure generally relates to the field of building panels, preferably floor panels, comprising a mix of plastic materials in powder form, preferably thermoplastic material and thermosetting resins, and fillers in powder form, preferably wood based and mineral fillers. Production methods to form such panels comprising locking systems are also disclosed.

FIELD OF APPLICATION

Embodiments of the present invention are particularly suitable for use in floors, which are formed of floor panels comprising a core, a decorative wear resistant surface layer and preferably a balancing layer on the rear side of the core. The following description of techniques, problems of known technology and objects and features of the disclosure will therefore, as a non-restrictive example, be aimed above all at this field of application and in particular at floorings which are installed floating with a mechanical locking system.

It should be emphasized that embodiments of the invention may be used to produce building panels in general such as, for example, wall panels and furniture components.

BACKGROUND

The following description is used to describe the background and products, materials and production methods that may comprise specific parts of preferred embodiments in the disclosure. The floor types described below typically have two major common features. They are intended to be installed in a floating manner with a mechanical locking system and the decor is, in most cases, obtained by colour pigments.

The different flooring types described below use two major classes of polymers, thermosetting and thermoplastic polymers, to provide a bonding between particles, mainly wood and mineral fillers. Such fillers are used to improve mechanical properties or just as extenders to decrease the amount of polymers used.

Thermosetting polymers are characterized in that they melt, float and polymerize with increased stiffness when heat and pressure is applied. They are completely cured and cannot be melted again. Thermoplastic particles on the other hand soften and melt when temperature is increased and the stiffness increases when they are cooled down.

Thermoplastic polymers are very moisture stable and may be formed as a product comprising only a specific polymer material. Thermosetting polymers are moisture sensitive and very brittle. They must be combined and reinforced with fibres, generally with wood fibres.

1. Thermosetting Flooring

This flooring category is characterized in that thermosetting resins such as, for example, Melamine Formaldehyde (MF), Urea Formaldehyde (UF) or Phenol Formaldehyde (PF) resins are combined with mainly wood fibres and cured under heat and pressure such that separate core or surface layers may be formed.

a) Laminate Floors

The majority of all laminate floors have a wood design. Such laminated floors have a core of 6-12 mm fibreboard, a 0.2 mm thick upper decorative surface layer of laminate and a 0.1-0.2 mm thick lower balancing layer. The decorative and wear properties are generally obtained with two separate layers of melamine formaldehyde impregnated paper (a decorative layer and a wear layer), one above the other. The decorative layer is a printed paper and the wear layer is a transparent overlay paper, which comprises small aluminium oxide particles. The core is generally a high-density fibreboard (HDF) comprising wood fibres and a mix of MF and UF resins. The decorative paper and the overlay paper are directly laminated by a hot-hot production method to the HDF core under high heat and pressure (170° C., 40 bar). Hot-hot pressing generally refers to a pressing method where a press table has essentially the same closing temperature as the opening temperature (e.g., within about 10° C.). Hot-hot pressing is very cost efficient since no cooling of the press table is needed but can only be used in direct lamination of thermosetting based surfaces that cure at high heat and that are laminated to rather thick core materials comprising thermosetting resins that are able to absorb the steam from the moisture of the core and the surface layer that is created at high pressing temperatures above 100° C.

A separate laminate sheet may also be produced in a continuous or discontinuous pressing operation and the laminate sheet is thereafter glued to a core material. This gluing, that may be made in cold condition, allows that separate laminate sheets may be bonded to different core materials, provided that they have similar moisture movements as the surface layer when relative humidity (RH) varies between dry (RH 20%) and wet conditions (RH 90%).

b) Powder-based Floors

Recently new "paper free" floor types have been developed with solid surfaces comprising a substantially homogenous powder mix of fibres, binders and wear resistant particles hereafter referred to as WFF (Wood Fibre Floor).

The powder mix may comprise aluminium oxide particles, thermosetting resin such as melamine formaldehyde resins and wood fibres. In most applications decorative particles such as, for example, colour pigments are included in the mix. In general, all these materials are applied in dry form as a mixed powder on a wood-based core such as a HDF core and cured in a hot-hot direct lamination step under similar heat and pressure as used in laminate floors.

Digital powder printing has been developed and it is possible to create very advanced wood, stone and tile designs by injecting water based ink drops comprising pigment dispersions into the powder prior to pressing. A recently developed Binder and Powder (BAP) printing method may also be used to provide a digital print on a powder-based surface. Conventional digital printing methods are divided in two separate steps comprising a separate application of a liquid binder, generally referred to as "blank ink" and of dry colorants, generally referred to as "dry ink". Coloured particles of dry ink are applied on a panel surface. Some particles are bonded by a digitally formed pattern of blank ink applied by a print head. Other non-bonded dry ink particles are removed and the remaining bonded particles form a digital decor. This two-step process may be repeated and several colours of dry ink may be applied such that an advanced multi colour high definition digital print may be formed in a cost efficient way. The major advantage is that rather simple water based liquid substances may be used and the pigment based dry ink colorants are very cost efficient since no pigment dispersions are needed.

2. Thermoplastic Flooring

This flooring category is characterized in that thermoplastic materials such as, for example, polyvinyl chloride (PVC), polypropylene (PP), or polyethylene (PE) are mixed with mineral or wood fibres. The final pressing is made under lower pressure than generally used in, for example, laminate production and with a hot-cold pressing method. The temperature is generally similar, about 140-160° C. Thermoplastic material melts at high temperatures and no curing takes place. The press table or belt must therefore be cooled down below 100° C. such that the thermoplastic layer is converted from a floating paste to a solid layer. Separate thermoplastic layers may be fused or laminated together by heating and cooling under pressure.

c) LVT Floors

Luxury Vinyl Tiles, generally referred to as LVT floorings, are generally constructed as a layered product made of thermoplastic material such as PVC, generally referred to as vinyl, mixed with mineral fillers, colour pigments and plasticizers. The name LVT is somewhat misleading since a major part of LVT floors have a plank size with a wood design. They may also comprise other plastic materials that are not vinyl. LVT has become a generic name for high quality resilient floor that may be installed floating with a locking system.

Thermal moulding is used to form the PVC layers. Co-rotating twin-screw extruders are used for the production of high-quality thermoforming PVC layers with fillers. The screws press and mix the material under heat.

The extruder may be filled with pre-formed small plastic pellets comprising a compound of PVC, pigments, fillers etc. Compounding is a process where mixing of polymers and additives in a molten state under heat and generally also under pressure is used in order to form plastic pellets comprising a homogenous blend of the different raw materials. Co-kneaders, twin-screw extruders and internal mixers are the most common compounders used in the plastic industry.

The compounding process may be avoided and an extruder may also be directly filled with basic plastic particles and separate fillers and other additives that are mixed in a hopper attached to the extruder. This method may be used to save material cost. Advanced twin-screw extruders with optimized screw geometry combined with accurate temperature control are used to obtain high melt homogeneity.

The extruder comprises a flat sheet die that provides a paste with essentially the same width as the finished layer. The die has generally oil temperature-controlled adjustable die lips that provide a wide thickness range.

The melted paste is further processed with 3-roll polishing calenders comprising a fixed central hot roll and two adjustable rolls on each side for calibration. The first roll is hot and the third roll is cold. The melt feed angle, which is determined by the weight and elongation of the melt, can be changed by adjusting the position of the first roll. Horizontal, inclined or vertical roll arrangements may be used.

A wide range of downstream equipment and methods are used to laminate the layers under heat and pressure and to cool the plastic layers to a multi-layer sheet. One simple method is to cut the layers to sheets and to use a multi opening hot-cold press. In continuous production several extruders may be used and the layers are hot when they are laminated together, in most cases with an intermediate layer of glass fibre. Cooling and stabilization of the panel in order to avoid warping takes a lot of space and a continuous production line may be several hundred meters long.

Extruders and calenders may be replaced with a continuous double belt presses comprising heating and cooling under pressure combined with several nip rollers. Plastic compounds in pellet form are scattered on the lower belt and pressed together under heat and pressure. A similar continuous press may also be used to laminate several sheets and foils to a LVT floor panel.

The core is made primarily of several layers that comprise PVC mixed with chalk and/or limestone fillers. The most common core materials comprise a middle part with about 50% limestone and a balancing layer with about 40% limestone. The lower limestone content in the backing is used to balance the high plastic content in the top layer. Some LVT core material may comprise up to 80% limestone fillers. Such core materials with high filler content are very brittle and it is difficult to form a strong locking system.

A 0.1 mm high quality printed decorative PVC foil is applied on the upper side of the core. A transparent wear layer of vinyl with a thickness of 0.1-0.6 mm is generally applied on the decorative foil. The base layer, the decorative foil and the transparent layer are fused or laminated together with heat and pressure in continuous or discontinuous press operations to a 3-6 mm floor panel. A transparent UV curing polyurethane (PU) lacquer is generally applied as a protective layer on the transparent PVC foil. LVT floor are installed floating with a locking system similar to laminate and powder based floors.

The decorative effects are obtained with a decorative foil that is printed separately and fused on the core layers. The foil comprises a single colour that generally is white and covers the dark colour of the core. The foil provides a base colour for the rotogravure printing process where special solvent-based inks comprising pigments are used to create wood, tile and stone designs.

d) WPC Floors

Wood Plastic Composite (WPC) panels comprising thermoplastic material mixed with wood particles have been used in extruded sections and injection mouldings in several industries during many years. Recently WPC flooring panels in plank sizes have been developed for outdoor use mainly as decking. Thermoplastic material such as PVC or PP is mixed with wood in the form of sawdust or wood chips by wood particle weight (wt) of about 50% to 80%. Products intended for exterior use may comprise 50 wt % or less of wood particles. The wood content may exceed 70 wt % in products intended for interior use. The processing is similar to the methods used to produce a LVT floor. A two-step process may be used where wood fibre particles and plastic particles in a first step are compounded together under heat and pressure to plastic pellets and fed into an extruder. Fibres and plastic granules may also be mixed directly during extrusion. Alternatively compounded plastic pellets may be scattered on a belt and pressed to WPC sheets in a continuous double belt press comprises a heating and a cooling section as described above. The decorative properties are mainly obtained by pigments that are included in the wood/plastic mix. WPC panels may also be printed, painted or foiled.

3. Combi-floor

Thermoplastic and thermosetting materials may be combined. Thermoplastic LVT layers may, for example, be glued to a HDF core or a WPC core.

Definition of Some Terms

In the following text, the visible surface of the installed floor panel is called "front side or upper side", while the opposite side of the floor panel, facing the sub floor, is called "rear side or lower side".

By "up" is meant towards the front side and by "down" towards the rear side. By "vertically" is meant perpendicular to the surface and by "horizontally" parallel to the surface.

By "panel" is meant an essentially flat sheet that comprises a core and a decorative surface formed on the core.

By "board" is meant an essentially flat sheet formed material that is intended to be covered by a surface layer and used as a core in a panel.

Known Technique and Problems Thereof

The general technologies, which have been developed by the industry aiming to improve the properties and cost structures of the above-described floors are described below. The methods may be used partly or completely in various combinations with preferred embodiments of the invention in order to create a board and a panel according to this disclosure of the invention.

The above described floor types have different properties and cost structures. Laminate and WFF floors have superior surface properties related to wear, impact and stain resistance. The hot-hot direct lamination method is very cost efficient. The major disadvantages are that they are hard, moisture sensitive and give a high sound level when people walk on the floor.

LVT floors on the other hand are soft, flexible, moisture proof and silent. However, several properties are inferior to laminate floors. The plastic surface is stain and heat sensitive and the production costs are generally higher than for laminate flooring since hot-cold pressing methods must be used. An LVT floor panel expands 3 mm/m when the temperature increases from 5-65° C.

The major advantage of WPC floors compared to LVT floors is that the wood fibres in the WPC floor counteract thermal expansion. WPC floor are also more rigid and may overcome defects in the subfloor. However, WPC floors are expensive to produce and it is difficult to apply an attractive decor layer that is wear and stain resistance and that has an appropriate moisture movement such that warping may be avoided. WPC floor are harder than LVT floors and the sound level is generally higher.

In general it is easy to form a strong locking system in a HDF core. WPC panels are rather rigid and the locking system may have similar strength or even higher compared to HDF based laminate floors. To form locking systems in a LVT floor is much more complicated due to the fact that the core is thinner and softer. A disadvantage is the fact that the locking strength of a LVT based locking system decreases considerably at increased temperatures when the core becomes softer.

It would be an advantage if a water proof thermoplastic core with sufficient strength to form a mechanical locking system and favourable moisture and thermal properties may be produced in a more cost efficient way and if such a core may be combined with a high quality surface layer comprising thermosetting resins, such as melamine formaldehyde resins. Considerable advantages may be obtained if such surface layer may be directly laminated with a cost efficient hot-hot pressing method to a thermoplastic core.

One problem that is preferably solved is the shrinking of the melamine resin that takes place during pressing when the resin cures and after pressing when the panel is cooled down to room temperature. Such problems have been solved when direct lamination is made against a wood based panel such as HDF and particleboard comprising thermosetting resins. The problems are not solved when lamination is made against a core comprising thermoplastic materials.

Another problem that is preferably solved is the different humidity variations of thermosetting and thermoplastic materials. As an example it may be mentioned that a surface layer comprising wood fibres and thermosetting melamine resins may expand about 0.8% when the relative humidity increases from 20 to 90%. Comparable expansion of a HDF core based on thermosetting melamine/urea binders may be about 0.4% and such a difference is possible to overcome with a strong lamination between the wood fibres in the core and the thermosetting resin in the surface layer. The lower moisture movement of the core will counteract the higher moisture movement of the thermosetting based surface layer and a laminated panel may have a moisture movement which is an average of the two movements, for example, a moisture movement of about 0.6%.

The humidity variations of a WPC panel may be only 0.05% during a time period when a melamine formaldehyde layer expands 0.8%. LVT panels are even more humidity stable and practically no expansion may be measured. Different humidity movements between a humidity sensitive surface layer comprising, for example, melamine laminated to a humidity stable WPC or LVT core comprising thermoplastic material will create large shear forces between the surface layer and the core and this may cause delamination. Furthermore it is also very difficult and in fact practically impossible to laminate a thermosetting layer with a hot-hot direct lamination method to a conventional WPC or LVT layer where all fillers are embedded in a thermoplastic layer. Conventional digital ink jet printing and digital BAP printing as described above are based on the main principle that the ink drops should not float or form clusters when they hit the surface. It is difficult to use digital printing on dense and non-absorbing surfaces such as thermoplastic surfaces. It would be a major advantage if surfaces comprising thermoplastic resins may be formed such that floating of ink drops may be avoided.

WO 96/27721 describes a WPC type of floor panel with a core of wood particles impregnated with a thermoplastic and with a decorative thermosetting laminate as a surface layer glued on top of the core. It is difficult to glue a thermosetting material to a thermoplastic WPC core and the disclosure does not give any description of how the gluing should be made. The materials have different humidity and moisture movements and such panels will warp or the glue layer will break when relative humidity varies between 20 and 90%.

EP 1847385 B1 describes a construction board with a core made of wood chips or wood fibres, which are glue-treated and pressed together, and two cover layers at the upper side and the lower side consisting of scattered WPC material. The core and the WPC cover layers are pressed together under heat such that the thermoplastic plastics materials of the WPC layers are bonded to the wood core. It is mentioned that the surface can be provided with a variety of building board coatings but no specific surface layer is disclosed. The bending strength may be increased and humidity movements may be reduced but a conventional wood based core layer in the middle parts such as particle board, HDF or OSB is not water proof and will swell considerably if exposed to water that may penetrate into the joints between adjacent floor panels.

WO 2008/122668 A1 describes a method of manufacturing laminate floor panels comprising a WPC core, a basic layer of paper or glass fibre melted to the WPC core and a top laminate comprising at least one paper layer impregnated with melamine resin, and being attached to the basic layer through this impregnation material or a plastic layer melted to a glass fibre basic layer. Such a basic layer may provide a lamination between the core and the laminate surface. However the thermosetting laminate layer will shrink and swell more than the WPC core and the panels will warp at low and high relative humidity, the surface or the glue layer may crack or delaminate.

WO 2012/053036 A1 describes a flooring comprising a base material layer of LVT and a single sheet of WPC laminated on top of the LVT. An adhesive layer is provided between the LVT and the WPC layer and a nonwoven cloth is embedded into the adhesive layer.

A disadvantage is that the lower part of the panel comprises a soft LVT layer and this part must be used to form the locking system. The locking strength will be low especially when the temperature increases due to direct sun exposure during the summer months or when floor heating is used.

EP 2402155 A1 shows a floor panel with a WPC layer and a reinforcement layer. The reinforcement layer is intended to minimize dimensional changes of the WPC layer. The reinforcement layer is incorporated within the WPC layer such that portions of the WPC layer extend at both sides of the reinforcement layer. The floor panel includes a high pressure laminate construction comprising at least a printed decorative layer and an impregnated protective overlay pressed together with heat and pressure. Alternatively the WPC layer may be provided with a polymeric film having a decoration pattern, which is printed on the film. The polymeric film may be melted to the WPC layer. Other alternatives are wood veneer layers and vulcanized cellulose layers.

The reinforcement layer may increase the possibilities to bond a thermosetting laminate to a thermoplastic core but it will not eliminate the problems related to different moisture movements of a thermosetting top layer connected to a thermoplastic core.

WO 2009/065769 (Välinge) describes that a panel may be formed by a powder mix of wood fibres and binders. Thermosetting binders may be used in the core and thermoplastic binders in the surface layer or the opposite.

WO 2011/129757 (Välinge) describes a digitally printed surface layer that may comprise a thermoplastic material, for example vinyl, applied in powder form on a substrate. Powder layers may comprise a mix of wood fibres, thermosetting binders in powder form and thermoplastic powder particles. It is also described that a powder based surface layer comprising thermoplastic particles may be applied on a core, preferably of plastic or wood, which may comprise one or several layers with different density. A LVT floor panel can be produced with a powder based and digitally printed surface layer.

US 2003/0008130 describes a water resistant particleboard comprising wood particles, thermosetting resins and resin particles of a thermoplastic resin. The particleboard comprises thermoplastic sheet material at the upper and lower side. The wood and thermoplastic particles have an average particle diameter of 1-2 mm. The average particle size of the outer layers is smaller than the particle size of the middle layer.

The three applications above do not provide solutions to bonding and moisture movements of a surface layer comprising thermosetting binders laminated to a core comprising thermoplastic material.

As a summary it may be mentioned that none of the above described methods may be used to obtain a considerable improvement of the surface properties, stability and cost structures of a thermoplastic based floor intended to be installed floating with a strong locking system.

Objects and Summary

A general objective of at least certain embodiments of the invention is to provide a thermoplastic based building panel that has better surface properties and more favourable cost structure that known building panel types.

A first specific objective of at least certain embodiments of the invention is to provide a panel, preferably a building panel, with a core comprising thermoplastic material, which gives the panel improved water resistant properties, and a surface comprising thermosetting resins that give the panel improved surface properties. The core and the surface should be such that a strong bonding may be obtained with heat and pressure and such that humidity movements of the materials in the core and in the surface are adapted to reduce warping and large shearing forces.

A second specific objective of at least certain embodiments of the invention is to form a board material that may be used as a core in such panels.

A third specific objective of at least certain embodiments of the invention is to adapt the core such that a strong locking system may be formed in such floor panels.

Embodiments of the invention are based on an understanding that conventional wood plastic composite materials such as WPC are mainly designed for construction purposes where high loads must be handled for a long time in outdoors environment. Performance optimising has been directed towards high bonding strengths between the wood fibres and plastic material, UV stability, bending strengths, deformation under load and similar. Several additives are included such as coupling agents that increase the bonding between the wood particles and the thermoplastic material and UV stabilizers that counteract colour changes. A mix of wood and thermoplastic particles is melted under pressure to form compounds of wood/plastic pellets that provide a homogeneous high quality panel after pressing or extrusion.

Such optimising is not suitable for floating floor applications where the panel is laying on a supporting sub floor in indoor environment and is covered by a protective surface layer. In fact it provides an unnecessarily high cost structure and the material properties can cause major problems related to the possibility of applying a surface layer comprising thermosetting resins especially if direct lamination is used based on a hot-hot pressing step. No attempts have been made to form a board that is adapted to provide a strong locking system.

Embodiments of the invention are based on a second understanding that the material properties of the core and preferably also of the surface layer must be changed compared to conventional technology in order to form a panel that has all the favourable core properties of thermoplastic based floor types but also the favourable surface properties of laminate and wood powder based floors where the upper layer comprises a high content of melamine formaldehyde resins. In general terms it means that a core comprising thermoplastic material should be adjusted such that it performs more in a way similar to a layer formed by thermosetting resins. It is preferred that the surface layer comprising thermosetting resins is adjusted such that is behaves more as a thermoplastic material.

According to a first aspect of the invention a method to produce a building panel is provided. The method comprises the steps of:

providing a core by forming a mat shaped layer comprising a dry blend of wood particles in powder form and thermoplastic particles in powder form, heating and cooling the mat shaped layer under pressure such that a sheet is formed after pressing;

applying a surface layer comprising a powder mix comprising wood particles and thermosetting resin on the core, and;

laminating the powder based surface layer in a hot-hot pressing operation to the core and thereby forming a building panel, wherein the wood particles of the surface layer and of the core are bonded to each other by cured thermosetting resin.

The sheet formed after pressing may be flat.

The surface layer may further comprise a thermoplastic material. The thermoplastic material may be located between the bonded wood particles. The thermoplastic material may comprise thermoplastic particles. In particular, the thermoplastic material may comprise melted thermoplastic particles. The thermoplastic particles may be comprised in the powder mix.

Forming the board from a dry blend and mixing thermosetting particles into the surface layer will increase the moisture movement of the core, decrease the moisture movement of the surface layer and improve the bonding properties such that a direct lamination in a hot-hot pressing operation may be made of the surface layer to the core.

The thermosetting resin may be an amino resin such as melamine formaldehyde resin, urea formaldehyde resin, a phenol formaldehyde resin, or a combination thereof.

The thermoplastic particles of the dry blend may comprise polyvinyl chloride (PVC), polypropylene (PP) or polyethylene (PE).

The thermoplastic particles of the dry blend may have an average particle size of about 0.3 mm or less.

The surface layer may be applied as two layers arranged above each other and an upper layer of the two layers may comprise bleached fibres and thermosetting particles. The bleached fibres may be bleached cellulose fibres.

The wood particles of the core may prior to application be dried to a moisture content of about 2% or less.

The wood particles of the core may prior to application be sieved to an average size of 1.0 mm or less.

The content of the wood particles in the core may be in the range of about 30-80 wt %.

The core may be formed with a pressure which is lower than 20 bar.

The thermoplastic material may be comprised in the powder mix of the surface layer and may comprise thermoplastic particles. Moreover, the thermoplastic particles may have an average size of about 0.2 mm or less.

The wood particles of the surface layer may be smaller than the wood particles of the core.

The core may comprise an intermediate layer and an upper layer. The intermediate layer may comprise a higher amount of thermoplastic material than the upper layer.

The intermediate layer may further comprise limestone particles.

The surface layer may comprise a transparent wear layer comprising thermosetting resins, wear resistant particles, such as aluminium oxide particles, and cellulose fibres, preferably bleached cellulose fibres.

The wood fibers of the core and/or the surface layer may be cellulose fibres, such as bleached cellulose fibres.

The thermosetting resin of the transparent wear layer may be an amino resin such as a melamine formaldehyde resin, a urea formaldehyde resin, a phenol formaldehyde resin, or a combination thereof.

According to a second aspect of the invention a building panel comprising a core and a surface layer is provided. The core comprises a mix of thermoplastic material and wood particles. The surface layer comprises a composite material comprising wood particles bonded to each other by a cured thermosetting resin. The surface layer is bonded to the core by the cured thermosetting resin.

The surface layer may comprise a composite material comprising individual thermoplastic particles spaced from each other and surrounded by wood particles bonded to each other by a cured thermosetting resin.

The surface layer may be bonded to the core by fused thermoplastic particles and cured thermosetting resins.

The thermosetting resin may be an amino resin such as a melamine formaldehyde resin, a urea formaldehyde resin, a phenol formaldehyde resin, or a combination thereof.

The thermoplastic material of the core may comprise PVC, PP or PE.

The surface layer may comprise thermoplastic particles with a size of about 0.2 mm or less.

The surface layer may comprise wood particles with an average size that is smaller than the average size of the wood particles of the core.

The building panel may be a floor panel.

One pair of opposite edges may be formed with a mechanical locking system comprising a protruding strip. Moreover, the protruding strip may comprise wood particles and thermoplastic material.

According to a third aspect of the invention a building panel having a core, a surface layer and a two opposite edges comprising a mechanical locking system is provided. The building panel comprises a tongue and groove for vertical locking and a protruding strip with a locking element in one edge cooperating with a locking groove in another edge for horizontal locking. The core is formed with three layers of materials. Each layer comprises thermoplastic materials and fillers. An upper and a lower layer comprise fillers of wood particles and an intermediate layer comprises fillers of mineral particles.

The locking element may be formed in the lower layer. Moreover, the protruding strip and the locking element may be formed in the lower layer. Additionally, the protruding strip, the locking element and the locking groove may be formed in the lower layer.

The locking element and the locking groove may be formed in the lower layer.

The building panel may be a floor panel.

The building panel may comprise a surface layer comprising wood particles and thermosetting resins.

The principles of embodiments of the invention may be used to form a board that may be used as a core in building panels, especially floor panels that comprise a surface layer with thermosetting resins that is directly laminated to the core. The board surface is adapted to such lamination since a considerable amount of free wood fibres are exposed at the surface and may be bonded with cured thermoplastic resins from the surface layer.

According to a fourth aspect of the invention a board is provided. The board comprises an upper surface, a lower surface, and an intermediate portion located between the upper surface and the lower surface. The intermediate portion comprises wood particles embedded in a thermoplastic material. The upper surface comprises essentially raw wood particles adapted to bond to a thermosetting resin.

At the upper surface, the essentially raw wood particles may protrude beyond the upper surface.

The thermoplastic material may comprise PVC, PP or PE.

The average size of the wood particles in the upper surface may be about 0.1-1.0 mm.

At the lower surface, wood particles may protrude beyond the lower surface.

BRIEF DESCRIPTION OF THE DRAWINGS

Embodiments of the invention will in the following be described in connection to embodiments and in greater detail with reference to the appended exemplary drawings, wherein, FIGS. 1a-d Illustrate a board and a panel with a core of such board material, a surface layer and a balancing layer, FIGS. 2a-h Illustrate board material produced by dry blends and thermoplastic compounds, FIGS. 3a-d Illustrate production methods to form boards and panels, FIGS. 4a-4d Illustrate floor panels with a locking system.

DETAILED DESCRIPTION

Figure 1A:
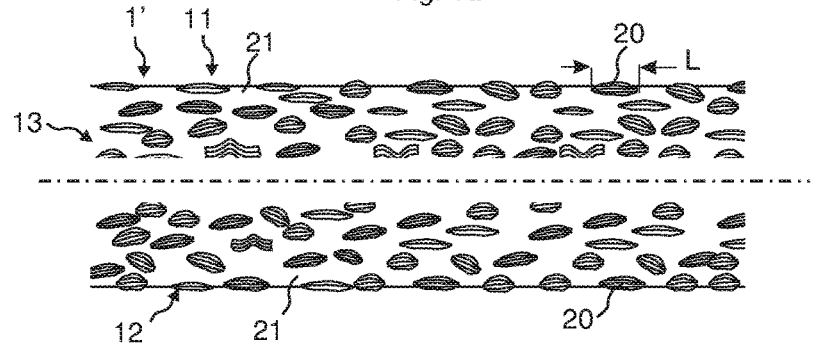

FIG. 1a shows a cross section of a board 1' according to a preferred embodiment of the invention. The board 1' is formed by a dry blend comprising a mix of thermoplastic particles in powder form and wood particles 20 in powder form which is pressed together under high temperature. The thermoplastic particles melt and form a thermoplastic material 21 that bonds the wood particles 20. With dry blend is meant a preferably uniform product comprising a dry mix of at least two different and separate materials in particle form that are preferably randomly distributed in the mix. The individual materials may segregate, for example due to vibration or material flow when forces are acting on the individual particles.

The dry blend is preferably applied as a dry powder layer on a lower belt of a continuous press, heated and cooled under pressure. The powder is pressed as a dry blend and not as a pre-formed plastic compound in pellet form. With plastic compound is meant a preferably uniform product comprising a mix of materials wherein at least one of the materials is in a molten state during mixing. The individual materials in a plastic compound particle cannot separate after mixing due to, for example, vibration.

Pressing parameters such as pressure, pressing time, pressing and cooling temperatures are adapted such that the production method may provide a board material that compared to a conventional WPC board is sufficiently water proof such that it may be used as a core in a water resistant floor panel but may have a higher humidity movement and may comprise wood particles 20 in the upper part 11 and the lower part 12 that are not completely covered by a plastic material 21 and that may be bonded to other fibres with a thermosetting resin when a fibre based surface layer is applied.

A board 1' may be formed with an intermediate portion 13 comprising wood particles 20 embedded in a thermoplastic material 21 and with an upper part 11 preferably comprising raw wood particles 20 that are essentially not covered by melted plastic particles and that may protrude slightly above the thermoplastic material 21 after pressing. With raw wood particles is meant a wood particle having at least one surface portion comprising wood material that is not covered by another material, for example a thermoplastic material. Preferably the lower part 12 comprises similar raw wood particles 20 protruding below the thermoplastic material 21. The raw wood particles 20 in the upper 11 and lower parts 12 are adapted such that they may be used to facilitate a strong bonding between the core and separate layers comprising, for example, a thermosetting resin such as a melamine formaldehyde resin that during lamination with heat and pressure may penetrate into the raw wood particles. The board 1' may be formed with a porosity that provides an appropriate humidity movement adapted to the humidity movement of a surface layer comprising, for example, a thermosetting resin.

As a non limiting example it may be mentioned that the dry blend may be pre-heated to about 80-120° C., e.g., about 100° C. prior to pressing, pressed with about 5-15 bar, e.g., about 10 bar in a heating zone under a temperature of about 130-200° C., e.g., about 160° C. and cooled to 50-100° C., e.g., about 80° C. under pressure in a cooling zone. The pressing time in the heating zone may be about 1-3 minutes, e.g., about 2 minutes, for a board that is about 4-5 mm thick.

The dry blend may, for example, comprise 40-60% by weight (wt %), e.g., 48 wt % PVC powder (e.g. Vestolit 6507) with particle size of about 0.08-0.2 mm, e.g., 0.1 mm, 40-60 wt %, e.g., 48 wt %, wood particles in powder form with an average length of about 0.5-2 mm, e.g., about 1 mm, and preferably 1-10 wt %, e.g., 4 wt %, colour pigments. A Wood Plastic Particle board hereafter referred to as a WPP board may be formed in a cost efficient way.

The WPP board is preferably 3-12 mm thick and the scattered dry blend is preferably compressed to about 25-30% of its original thickness to a rigid board with a preferred density of about 1100-1300 kg/m3. An even more preferred thickness range for a board material intended to be used as a core for floating floor panels in home environment is about 3-6 mm and such a board is preferably formed from a dry blend having a thickness after scattering but prior to pressing of about 1-2 cm.

Several thermoplastic materials that are available in powder form may be used such as, for example, polyvinyl chloride (PVC), polypropylene (PP) and polyethylene (PE) and they may be mixed. The moisture content of the wood particles is preferably 1-2% but moisture contents preferably up to about 6% may also be used. The wood particles may comprise individual fibres or several fibres connected to each other. The particle thickness is preferably smaller than the particle length. The average length L of the wood particles is preferably 0.1-1.0 mm. The particles may also comprise cellulose fibres that may be bleached cellulose fibres.

The dry blend is preferably scattered on a belt as a mat shaped layer and scattering forms the required thickness. The dry blend may also be applied as a thick layer that is equalized to required mat thickness with a ruler that removes excess material.

It is preferred to use wood particles with low moisture content, preferably 2% or lower, especially when the WPP panel in a second production step is used as a core that is direct laminated in a hot—hot pressing operation with a layer comprising thermosetting resins. High moisture content creates steam that may cause surface defects such as locally delaminated surface portions.

An optimization of wood particle size and content, pressure, pressing time and temperature may be used to form a board with desired properties. For example, small well defined particles with an average size of less than 1.0 mm, a high resin content >50 wt %, high pressure of about 40-60 bar, longer pressing time and high pressing temperature up to 180-190° C. will improve water resistance and climate stability of a WPP panel. The disadvantages are that density and material cost will increase and it will be more difficult to bond a surface layer comprising thermosetting resins to the WPP panel. Consequently, there are some limitations that may be considered when the objective is to form a cost efficient panel with appropriate properties that is possible to combine with surface layers comprising thermosetting resins.

Floating of thermoplastic particles increases when melting temperature is increased from, for example, 160 to 200° C. Wood particles will change colour at increased temperature above 190° C. and the properties will deteriorate considerably above 200° C. A high pressure, for example, 30-40 bar and even a pressure of 60 bar and higher combined with a high temperature, for example, 190° C. will provide a very homogenous high density and moisture stable material with high mechanical strengths. Such board materials may, for example, be suitable for construction purposes, outdoor use and for floors with very high water resistance but may generally not be the most preferred solutions when the board is intended to be used as a core in a moisture resistant floating floor for indoor use with a moisture sensitive surface layer comprising thermosetting resins. Therefore, in some applications, rather low pressures around 5-20 bar and pressing temperatures of 160-180° C. may be preferred since this will reduce the density and the floating of the melted thermoplastic particles. In some applications it is also possible to produce the board with a low pressure of a few bar only.

A panel with a porous microstructure may be formed with properties that provide a suitable moisture movement and a base for direct lamination of a surface comprising thermosetting resins.

The pressing time in relation to board thickness is also important. Long pressing time will create more floating than a shorter pressing time. Thicker boards require a rather long pressing time until an appropriate temperature is reached in the middle section of the board. A long pressing time may damage the plastic material in the upper and lower parts close to the press tables that are exposed to higher temperatures during a longer time than the middle section. A thicker board of, for example, 6 mm may be produced as two 3 mm boards that are fused together with heat and pressure.

A high starting temperature may reduce the pressing time considerably. For example, the pressing time of a 4 mm board under 160° C. may be reduced from 4 minutes to 2 minutes if the dry blend is pre-heated to 100° C. prior to pressing. A preferred pre-heating is 80-120° C. Of course higher temperatures up to, for example, 150° C. may be used. The dry blend is preferably pre-pressed prior to the pre-heating and/or the final pressing such that a major part of the air between the particles is removed.

A WPP board is preferably prior to the pressing step formed with several layers comprising different material compositions. The middle part of the core 5 that preferably comprises about 60% or more of the core thickness may, for example be formed from a dry blend comprising 40-60 wt %, e.g., 50 wt %, wood particles and 40-60 wt %, e.g., 50 wt %, thermoplastic particles. This may provide a high water resistance. The dry blend in the upper and lower portions of the core 5 may comprise, for example, 50-70 wt %, e.g., 60 wt %, wood particles and 30-50 wt %, e.g., 40 wt %, thermoplastic particles and this may provide a high bonding strength between the core 6 and a surface layer 4 comprising thermosetting resins.

The thermoplastic particles of the dry blend melt during pressing and form a plastic material that at least partly surrounds the wood particles. In particular, the plastic material may completely surround the wood particles. All parameters disclosed above are preferably adapted to the type and size of thermoplastic particles that are used since they may have different melting temperatures and floating properties.

A WPP board may have very favourable properties. For example, a board based on 40-60 wt %, e.g., 50%, PVC powder and 40-60 wt %, e.g., 50%, virgin wood powder of soft wood such as, for example, spruce or pine is waterproof and thickness swelling after 24 hours in water may be about 3-5%, e.g., about 4%. This could be compared to conventional HDF that swells 16% and WPC that swells 2%.

The moisture movement along the board, when the relative humidity RH changes from 20% to 90%, may be about 0.1-0.2% compared to 0.4% for HDF and 0.05% and lower for WPC.

The wood particle content may vary preferably between 20-80 wt % and even more preferred between 40-60 wt %. Small wood particles sieved trough a mesh of 0.3 mm and small thermoplastic particles sieved trough a mesh of 100 microns provide after pressing a more homogenous board than, for example, larger wood or thermoplastic particles in the range of 0.6 mm for wood particles and 200 microns for thermoplastic particles. This may be used together with the pressing parameters described above to optimize the moisture movements and the bonding properties of the board to various other layers applied on the upper 11 and/or the lower 12 part.

The whole board 1' may be scattered in one operation. The board may also be scattered as a multilayer board where several layer are applied on each other with preferably different material compositions. The size and the material properties of the particles and the mix between thermoplastic particles and wood particles may vary in the layers.

The board may be used as a floor panel without any additional decorative surface layers. Pigments may be sufficient to create a decor. In some applications only a protective lacquer may be sufficient. Wear resistant particles may be included in the upper part 11 of the board. Prints, preferably digital prints, applied directly on the WPP board or on an intermediate plastic foil preferably covered by a protective lacquer, such as, for example, a UV curing lacquer and/or a thermoplastic transparent foils may also be used.

An advantage is that the properties of the fibre structure in the upper part 11 form a print layer such that a digital print, preferably a water based digital ink jet print comprising pigment dispersions, may be applied with reduced or even without ink drop bleeding that generally is the case when water based ink drops are applied on a thermoplastic non absorbing surface.

The Binder and Powder (BAP) printing method may also be used to provide a digital print on the board. A liquid binder, generally referred to as "blank ink", comprising for example water and viscosity increasing substances, such as for example glycol, is applied by a Piezo print head in a pre-defined pattern on the upper part 11 of the core 5. Colorants, generally referred to as "dry ink", comprising for example wood fibres and colour pigments are applied on the liquid pattern. Some colorants are bonded by the digitally formed liquid pattern of blank ink. Other non-bonded dry ink colorants are removed and the remaining bonded colorants form a digital decor. This two-step process may be repeated and several colours of dry ink may be applied such that an advanced multi colour high definition digital print may be formed in a cost efficient way. The major advantage is that the wood fibres in the upper part of the board reduces or eliminates uncontrolled floating of the blank ink drops and a high quality BAP print may be obtained on a board that comprises non absorbing thermoplastic material.

In some applications it is preferred to use bleached cellulose fibres in the upper part 11 of the core 5. Such fibres may increase the printing quality when conventional direct printing or digital printing technologies are used. The bleached cellulose fibres may comprise colour pigments that may be used to form a base colour for the print.

The wood particles may be combined with other fillers, for example, mineral fillers such as stone powder, quartzous sand, clay materials, feldspathic fluxes, chalk, limestone and similar. Plasticizers and foaming agents may also be included in the dry blend. Some of the materials may be included as compounded pellets or powder produced by plastic compounds. A preferred dry blend is a mix comprising wood particles mixed with mineral particles such as, for example, limestone and this may be used to increase the water resistance. A higher amount of limestone may be used in the middle section than in the upper and lower sections of the board. The middle section may comprise wood /limestone fillers and the upper and lower sections may comprise only wood fillers. The middle section may, for example, comprise a mix of about 40-60 wt %, e.g., 50 wt %, thermoplastic particles, 20-40 wt %, e.g., 30 wt %, limestone and 10-30 wt %, e.g., 20 wt %, wood particles.

Recycled fibre based materials such as, for example, particles comprising recycled carpets, nylon fibres, packaging material or textile fibres, may also be used as fillers. Packaging materials comprising laminated layers of wood fibre material and thermoplastic material are especially suitable as filler since they may comprise 10-20% thermoplastic material that may be used as a binder.

All the above-mentioned fillers may be used in some applications to partly or completely replace wood particles in separate layers of the board or in the complete board.

The board 1' may be cut and the edges may be formed by conventional rotating tools. Scraping or carving may also be used preferably combined with increased temperature. Dust and chips from machining and scraping may be recycled and mixed into the dry blend.

Figure 1B:
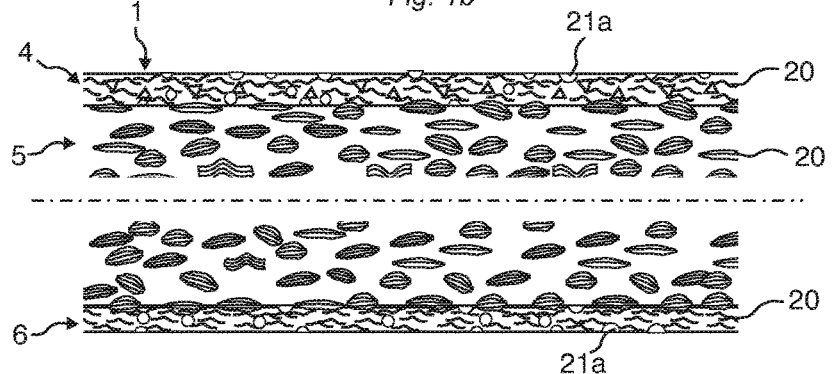

FIG. 1*b* shows a panel 1 according to a preferred embodiment of the invention where an upper surface layer 4 and a lower balancing layer 6 comprising wood particles 20 and thermosetting resins are laminated to a core 5 comprising a WPP board 1' as described above. Preferably, the surface layer 4 and preferably also the balancing layer 6 are directly laminated under heat and pressure in a separate hot—hot production process to a pre-formed core 5. This two-step production method provides the advantages that pressing parameters may be optimized to the forming of the board material that constitutes the core 5 and to the lamination of the surface and balancing layers to the core. Preferably the board is cooled to room temperature and stored for several days prior to the final lamination of the surface and balancing layers.

The core 5, the surface layer 4 and the balancing layer 6 may also be produced in a one-step operation with a continuous or discontinuous pressing operation that preferably is a hot-cold process. A one step hot—hot process may also be used.

The thermosetting resin in the surface layer 4 and in the balancing layer 6 may be melamine formaldehyde, urea formaldehyde or phenol formaldehyde resin, or a mix of these resins. The resins are preferably applied in dry powder form. Alternatively wood particles may be impregnated with liquid resins and dried. Preferably thermoplastic particles 21*a* may be included in the surface layer 4 and the balancing layer 6 in order to increase the bonding between the core 5 and the surface layer 4 and to reduce moisture movements and shrinking forces during production and cooling to room temperature.

Preferably, the surface layer 4 comprises a decorative wear layer 3 that is scattered on the WPP core. The decorative wear layer 3 may comprise, for example, a 300-500 g/m2, e.g., 400 g/m2, powder mix of 25-45 wt %, e.g., 36 wt %, melamine formaldehyde particles, 20-40 wt %, e.g., 30 wt %, PVC powder, 15-35 wt %, e.g., 25 wt %, wood fibres, 4-10 wt %, e.g., 7 wt %, Aluminium oxide 22 and 1-3 wt %, e.g., 2 wt %, colour pigments. The PVC powder may be a raw PVC powder without any additives such as, for example, emulsion PVC (Vestolit 6507) with a particle size of 0.1-0.2 mm or emulsion PVC (Vestolit P 1353K) with a particle size of about 0.04-0.06 mm. A small particle size gives generally a higher quality since the small PVC particles gives a more homogenous material structure. It is preferred to use larger thermoplastic particles in the core 5 than in the surface layer 4. Preferably, the thermoplastic particles that are used to form the core 5 have an average size, which is larger than about 0.10 mm, and the thermoplastic particles that are used to form the surface layer have an average size, which is smaller than about 0.10 mm.

The dry blend that is used to form the balancing layer that preferably also is scattered on the WPP board comprises in this preferred embodiment about 100-300 g/m2, e.g., 200 g/m2, powder comprising a mix of 25-45 wt %, e.g., 35 wt %, melamine, 25-45 wt %, e.g., 35 wt %, wood fibres and 20-40 wt %, e.g., 30 wt %. PVC powder.

The powder layers are preferably applied in two steps. The balancing layer 6 is in a first step scattered on the WPP core 5 and stabilized by spraying with water such that the melamine powder melts. The wet powder surface is heated with IR light such that a hard but uncured powder surface is formed allowing the WPP board to be turned with the scattered surface pointing downwards. The wear resistant decorative layer 3 is thereafter scattered on the upper part of the WPP core 5 and the decorative powder layer 3 is stabilized in the same way as the balancing layer 6.

The powder layers 3, 6 are thereafter directly laminated to the WPP core in a hot-hot pressing operation where, for example, a 30-50 bar, e.g., 40 bar pressure may be applied during 10-30 seconds, e.g., 20 seconds, under a temperature of 130-200° C., e.g., 160° C. Preferably the cured surface layer 4 and the cured balancing layer 6 comprises individual thermoplastic particles 21*a* spaced from each other and surrounded by wood particles 20 bonded to each other by the thermosetting resin. The surface layer 4 and the balancing layer 6 are preferably bonded to the core 5 by cured thermosetting resins and preferably also by melted thermoplastic particles 21 that are fused together when cooled to room temperature after heating under pressure.

The direct lamination pressure may be decreased considerably even in the case when deep embossed surfaces are formed since the thermoplastic core becomes softer when heated during the lamination and creates a more even counter pressure than, for example, HDF. Embossed structures with a depth of about 0.5 mm and more may be formed with a direct lamination pressure of about 20 bar and even lower.

The layers have been modified considerably compared to known technology in order to allow a direct lamination of a surface layer 4 comprising thermosetting resins to a core 5 comprising thermoplastic material. The modifications have been made based on the following principles.

The moisture movements of the WPP core material have been increased considerably compared to a conventional WPC board in order to be able to handle the moisture movements of the surface layer that comprises a thermosetting resin. This has been accomplished with a core that is based on a dry blend of wood fibres and thermoplastic powder and that after pressing obtains material properties allowing moisture to penetrate into the core in high humidity and to evaporate in dry conditions.

Preferably, the moisture movement and the shrinking during pressing and cooling to room temperatures of the powder based surface layer comprising thermosetting resins and wood fibres have been reduced and flexibility of the layer has been increased by for example including thermoplastic particles into the powder layer. Thermosetting resins in powder form and thermoplastic particles in powder may be combined if they are mixed with wood fibres that bond to both plastic types.

The WPP core is adapted such that a surface layer may be directly laminated to the core with a hot-hot process. Forming a core from a dry blend of small wood particles in powder form and thermoplastic particles in powder form creates a matrix material when pressed together with heat that comprises a considerable amount of free uncoated fibres at surface portions of the core that may be used to provide a strong bonding of a surface layer comprising thermosetting resins to a core comprising thermoplastic material.

One disadvantage may be that the upper part of the exposed cured surface layer comprises small thermoplastic particles 21a that may be more stain sensitive than the majority of the exposed surface that comprises cured wood fibre/melamine material. The small melted thermoplastic particles 21a may also form small protrusions above the main surface when the hot press table is opened after the lamination. Such small protrusions may be removed with a brushing operation when the surface is cooled down.

Figure 1C:
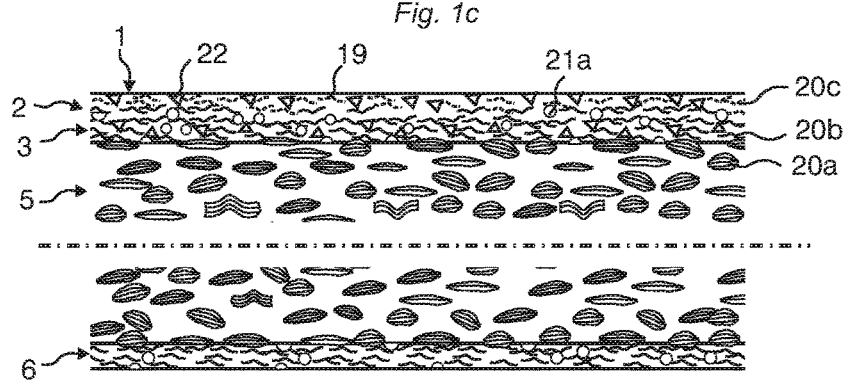

FIG. 1c shows that as an alternative, the thermoplastic particles 21a in the decorative surface layer 3 may be covered with a transparent wear layer 2 without thermoplastic particles. Such a transparent wear layer 2 may be a powder overlay, preferably comprising melamine formaldehyde resins and cellulose fibres, preferably bleached cellulose fibres 20c. The powder overlay may also comprise colour pigments and/or aluminium oxide particles 22. A powder overlay mix may, for example, comprise 60-85 wt %, e.g., 72.5 wt %, melamine formaldehyde resins, 50-30 wt %, e.g., 22.5 wt %, transparent cellulose fibres, and 2-8 wt %, e.g., 5 wt %, aluminium oxide particles. Such a powder overlay 2 may be very thin, for example, about 50-100 g/m2 and will not have any major effect on the shrinking forces during pressing and the moisture movement. The stain resistance will be superior to most thermoplastic surfaces. It is of course possible to include small thermoplastic particles in the overlay and the stain resistance will be marginally affected especially if the particles are small and the content is low. The transparent overlay 2 may also be applied directly on the core 5. Alternatively, the transparent wear layer 2 may be an overlay paper. A UV lacquer may also be used as protective layer.

Preferably, different fibre types and particles sizes may be used in the different layers. The average size of the fibres or wood particles 20a in the core 5 is preferably larger than the average size of the fibres 20b in the decorative wear layer 3. The transparent wear layer 2 comprises preferably bleached cellulose fibres 20c and the core 5 and the decorative wear layer 3 comprises preferably opaque fibres 20a, 20b. The content of the plastic particles in the core 5 may vary. A higher content of thermoplastic particles may be used, for example, in the middle parts of the core 5 than in the outer parts of the core and the fibre content in the outer parts of the core may be higher than in the middle parts of the core. This will facilitate a strong bonding of the surface layer 4 and the balancing layer 6 during direct lamination when thermosetting resins float and penetrate into wood fibres of the wood particles in the outer parts of the core 5.

A floor panel according to an embodiment of the invention is preferably characterized in that the content of the thermoplastic material is higher in the core 5 than in the decorative wear layer 3. The content of the thermoplastic particles in the surface layer 4 may also vary and may be higher in a lower layer closer to the core 5 than in an upper layer closer to the uppermost surface portion.

A surface layer 4 that comprises only thermosetting resins and wood fibres but no thermoplastic particles may also be direct laminated to a WPP core. The moisture movement of the surface layer 4 and the core 5 may be adapted such that delamination is prevented. For example, the surface layer may comprise urea formaldehyde resin that is less moisture sensitive than melamine formaldehyde resins.

Figure 1D:
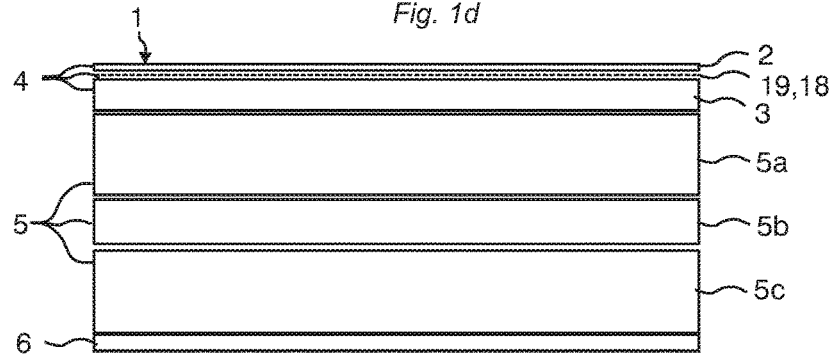

FIG. 1d shows a floor panel 1 that may have the same surface layer 4 and balancing layer 6 as described above and shown in FIGS. 1b and 1c. The surface layer 4 may also comprise a digital print 19 applied on the powder based decorative layer 4 preferably comprising a base colour. The digital print 19 may also be applied on a paper layer 18, comprising a base colour and incorporated into the decorative powder layer. The paper layer may also be a printed paper impregnated with a melamine resin. Alternatively the paper 18 is not impregnated and is located between upper and lower powder layer comprising a thermosetting resin. Impregnation and bonding takes place automatically during pressing when liquid melamine resins from the lower decorative powder layer 3 and the upper powder overlay 2 penetrate into the fibres of the paper. Powder overlay 2 may be replaced by a conventional melamine impregnated overlay. PU coating and/or transparent plastic foils may also be used as an upper protective layer.

The core 5 comprises an upper 5a and a lower part 5c that is a WPP material as described above and one or several intermediate layers 5b. The intermediate layer is preferably a Mineral Plastic Particle (MPP) layer that comprises a mix of thermoplastic material and mineral fillers, for example, limestone. Such a layer may be rather elastic and soft, especially if plasticizers are used and may provide sound damping and softness to the floor. The intermediate layer is preferably scattered as a dry blend, comprising thermoplastic particles in powder form and minerals in powder form, when the core 5 is formed in the same way as the upper 5a and the lower 5c layers. The intermediate layer may also be produced in a separate step according to conventional methods used to form the known LVT layers and may be bonded to the scattered layers with heat and pressure. The intermediate layer and other core layers may also comprise a mix of minerals, wood fibres and thermoplastic particles. Chalk, talcum powder, limestone and cork particles may, for example, be used as fillers. Very thin layers, for example, 0.1-0.5 mm or 0.2-1.0 mm may be sufficient to improve the sound properties and the flexibility of the panel.

A wide range of recycled wood and mineral particles may be used in all core layers and such materials may be mixed together. It is preferred to use HDF waste or particleboard waste or similar wood based waste that comprises binders and that is not suitable for burning due to environmental considerations. Old replaced laminate floors may be milled to small particles and used as filler.

The WPP board may be replaced with other core materials, for example, HDF boards and mineral boards, in all embodiments of the invention. A mix of wood fibres, thermosetting particles, thermoplastic particles, pigments and wear resistant particles with or without a powder overlay as described above may be used as a surface layer. This provides several advantages compared to conventional technology. The shrinking during production and moisture movements will be reduced. Thinner balancing layer may be used. It is also cost efficient to replace, for example, melamine with thermoplastic particles.

FIG. 2a shows plastic compounds 23 in pellet form that have been produced, for example, by an extruder. The plastic compound 23 comprises wood particles 20 that have been mixed with a thermoplastic material 21 under heat and pressure to a homogenous mix. Such thermoplastic compounds 23 are used to form a Wood Plastic Composite board or a so-called WPC board 40 as shown in FIG. 2b. The board 40 and its upper 11 and lower 13 parts comprise a homogenous mix of wood particles 20 and thermoplastic material 21 and practically all wood particles are embedded in the thermoplastic material.

FIG. 2c shows a dry blend 25 of thermoplastic particles 21a in powder form and wood particles 20 in powder form. The average length L of wood particles 20 is preferably about 1.0 mm or smaller. The thermoplastic particles 21a are preferably even smaller and may have a size of about 0.1-0.2 mm. FIG. 2d shows that a Wood Plastic Particle board 41 or a WPP board is formed when the dry blend 25 is pressed together under heat. The dry blend 25 forms a material structure that is not completely homogenous and this allows the wood fibres of the wood particles 20 to shrink and swell slightly in different humidity. There may be a sufficient amount of wood fibres in the upper 11 and lower 13 surface parts of the WPP board that are not completely covered by thermoplastic material 21 and this provides a strong bonding between the WPP board and a surface layer when heat and pressure is applied to a surface layer that may comprise thermosetting particles or thermoplastic and thermosetting particles mixed with wood fibres. The wood particles 20 in the upper part 11 of the board 41 and preferably also at the lower part 13 of the board may protrude slightly above or below the melted thermoplastic material 21 when the pressure from the forming of the board is released.

FIGS. 2e-2h show a similar forming of a layer or a board material as discussed above with reference to FIGS. 2a-d. In this preferred embodiment wood particles 20 have been replaced with mineral particles 24. A Mineral Plastic Composite (MPC) board 42 is formed when a plastic compound 23 comprising mineral particles 24 is used as raw material as disclosed in FIG. 2e and FIG. 2f. A Mineral Plastic Particle board 43 is formed when a dry blend 25 comprising mineral particles 24 is used as raw material as disclosed in FIG. 2g and FIG. 2h.

Figure 3A:
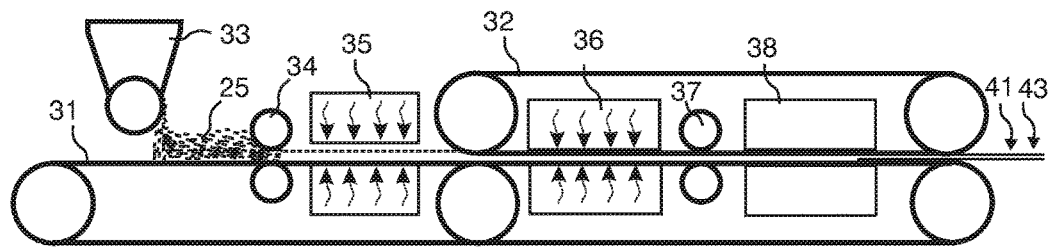

FIG. 3a shows a production equipment and a production method that may be used to form a panel from a dry blend 25 of thermoplastic particles and fillers such as wood particles or mineral particles according to the embodiments described above. A dry blend 25 is applied by a scattering unit 33 on a lower belt 31, compressed through a 2-roll calender 34 and heated in a pre-heating zone 35. The heated dry blend is thereafter pressed between the lower belt 31 and the upper belt 32 under high temperature in a pressing and heating zone 36 such that the thermoplastic particles melt. The melted powder is thereafter sized to the required thickness by nip rollers 37 and cooled under pressure in a pressing and cooling zone 38 to the required outlet temperature such that, for example, a wood plastic particle board 41 or a mineral plastic particle board 43 is formed. The dry blend may comprise a mix of different fillers, for example, wood particles and mineral particles.

The wood 41 or mineral 43 particle board may comprise one or several individually produced layer as described above that may be fused together with heat and pressure to a thicker multi-layer board. Preferably, the individual layers may have a thickness of about 1-3 mm.

A board may be formed with a very low pressure, for example, a few bar. Improved quality may be obtained with higher pressures, for example, 5-10 bar.

The production may comprise two continuous presses. One press may be a hot press and one press may be a cold press. The advantage is that it is not necessary to heat and cool the upper 32 and lower 31 belts.

A WPP board may also be produced with a hot-hot pressing operation in continuous or discontinuous presses. A cooling without pressure increases the porosity of the board. Internal bonding strength and water resistance will generally be lower than for similar boards produced with a hot-cold pressing operation. This may be compensated with a higher content of thermoplastic particles.

Figure 3B:
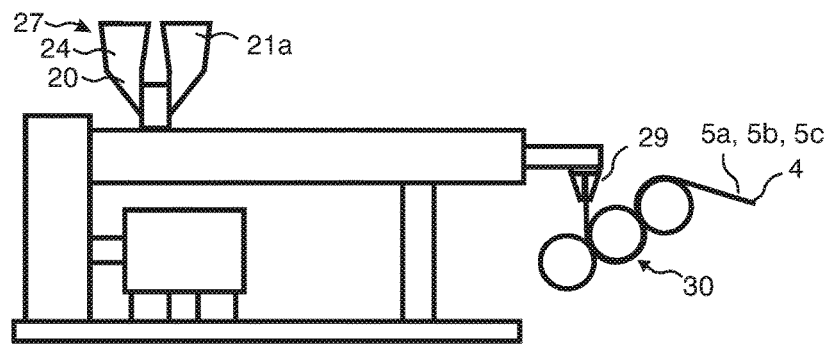

FIG. 3b shows an extruder and a production method to form a layer comprising thermoplastic particles and fillers. A hopper 27 is filled with thermoplastic particles 21a and fillers, for example, mineral fillers 24 or wood fillers 20 and the particles are mixed according to specifications and loaded into the feed section of the extruder. The material is fed through one or two screws, melted and mixed into a homogenous blend by a combination of heat and shearing forces. From the screw tip, the material is filtered and pressed through a flat sheet die 29 that provides a paste with essentially the same width and thickness as the finished layer. The die 29 has generally oil temperature-controlled adjustable die lips.

The melted paste is further processed with 3-roll polishing calenders 30 comprising a fixed central hot roll and two adjustable rolls on each side for final calibration of a layer that may be used as a core layer 5a, 5b, 5c or a surface layer 4 in a floor panel according to the invention. A board may comprise several layers, which are formed as WPP, WPC and MPC board material as described above.

The extruder may be used to produce plastic compounds in pellet form.

Figure 3C:
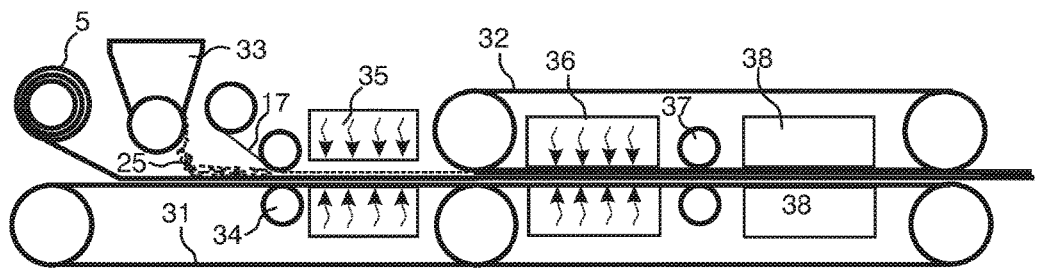

FIG. 3c shows that separate layers, for example, a core layer 5, dry blends 25 and decorative foils 17 may be formed and laminated together in a continuous hot-cold pressing operation. The pressing steps described in FIGS. 3a and 3c may be combined in a continuous production line with cooling and annealing downstream equipment.

Figure 3D:
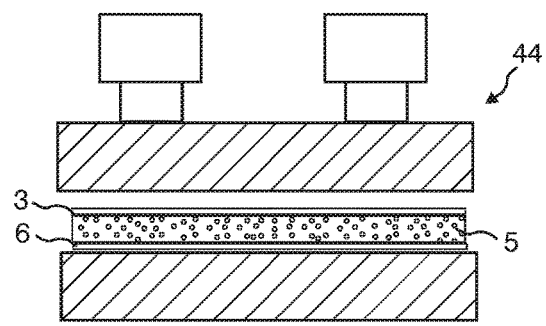

FIG. 3d shows a discontinuous press 44 that may be used to apply a surface layer 3 and a balancing layer 6 comprising thermosetting resins, wood particles and preferably thermoplastic particles to a core 5 comprising thermoplastic particles and fillers, preferably wood fillers. The application is preferably made with a hot-hot pressing method.

Figure 4A:
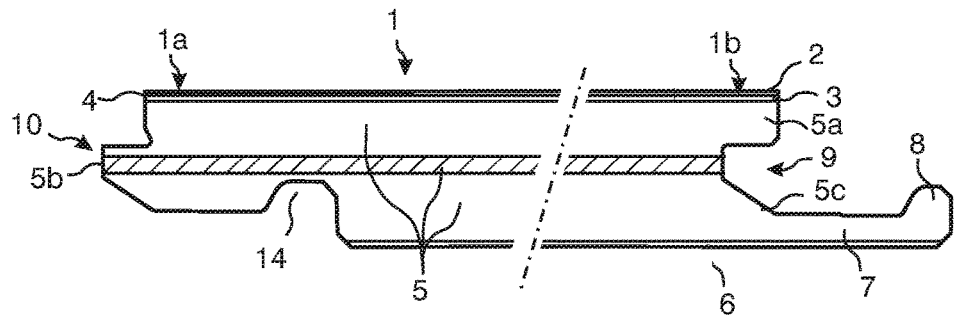
Figure 4B:
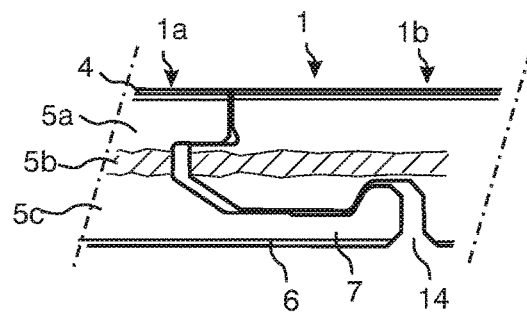

FIGS. 4a and 4b show a floor panel 1 with a locking system comprising a tongue 10 and a groove 9 for vertical locking and a protruding strip 7 with a locking element 8 in a first edge 1b that cooperates with a locking groove 14 in a second adjacent edge 1a and locks the edges in a horizontal direction. The tongue 10 may be formed on the second edge comprising a locking groove, as shown in FIG. 4a. The tongue 10 may also be formed on the first edge comprising the strip 7 (not shown). The tongue groove 9 may also be formed on the first or the second edge. The panel has a core 5 with an upper layer 5a and a lower layer 5c, each comprising wood particles mixed with thermoplastic material and an intermediate layer 5b preferably comprising mineral particles and thermoplastic material. The intermediate layer 5b is preferably softer than the upper 5a and lower 5c layers and may be used to provide sound damping. The strip 7, the locking element 8 and the locking groove 14 are formed in the rigid lower layer 5c.

The intermediate layer 5b may be formed as a separate layer and may be laminated between the upper and lower layers that may be applied as a dry blend prior to pressing. The intermediate layer 5b may also be applied as a dry blend as shown in FIG. 4b.

Figure 4C:
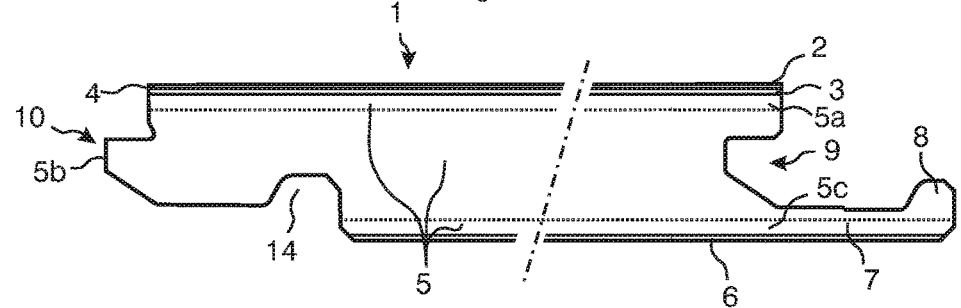

FIG. 4c shows an embodiment where the intermediate layer 5b comprises a higher content of thermoplastic material and a lower fibre content than an upper 5a and a lower 5c layer. Such a core may be formed with, for example, increased rigidity and moisture resistance and this could be combined with a direct lamination of the surface layer 4 and the balancing layer 6 that is made against layers that comprise a higher fibre content.

Figure 4D:
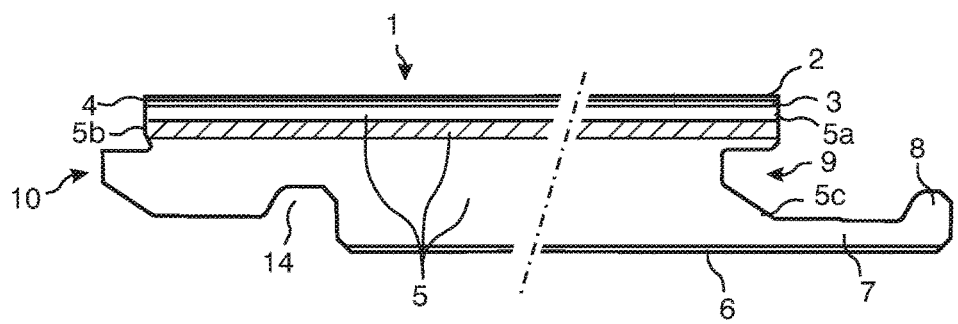

FIG. 4d shows an embodiment where a softer layer 5b, preferably comprising thermoplastic material mixed with wood fibres and/or minerals is applied at an upper part of the core 5, preferably above the tongue 10 and the groove 9. Such a core provides increased sound damping.

A lot of separate layers and materials may be included in the core, for example, glass fibres or metal foils. Foils, for example, aluminium foils, may improve heat distribution when floor heating is used in the sub floor. Foils that provide heat may also be incorporated into the core.

EXAMPLE 48 wt % of wood particles and dry fibres from spruce, with a moisture content of about 1% and sieved trough a 400 microns mesh, was mixed with 48 wt % of PVC particles (Vestolit 1353) with an average size 60 microns and with 4 wt % of grey colour pigments such that a dry blend of wood particles in powder form and thermoplastic particles in powder form was obtained. The dry blend was thereafter applied as a 12 mm thick powder layer on a 0.6 mm aluminium sheet, pre-heated in a hot air oven to 100° C. and brought into a hydraulic press. The dry blend was pressed during 2 minutes under a heat of 160° C. and with a pressure of 10 bar and cooled. The press was opened when the temperature reached to 80° C. A flat and rigid 4 mm grey Wood Plastic Particle (WPP) board was obtained at room temperature.

A balancing layer of 200 g/m2 of powder comprising a mix of 35 wt % melamine, 35 wt % wood fibres and 30 wt % PVC powder (Vestolit 1353) was scattered on the WPP board, spayed with water and dried with an IR lamp such that the mix was bonded to the WPP board allowing the board to be turned upside down with the dry uncured balancing layer pointing downwards.

A 400 g/m2 decorative and wear resistant surface layer with a light brown base colour was thereafter scattered on the upper side of the WPP core. The decorative wear layer comprised a powder mix of 36 wt % melamine formaldehyde particles, 30 wt % raw PVC powder (Vestolit P 1353K) with a particle size of about 0.04-0.06 mm, 25 wt % recycled wood fibres/wood particles, 7 wt % Aluminium oxide and 2 wt % colour pigments.

A water based ink comprising 30% water based pigment dispersions and 70% glycol, water and acrylic binder was injected with a digital Piezo ink head into the powder and a wood grain decor was formed.

A 50 g/m2 powder overlay mix comprising 72.5 wt % melamine resins, 22.5 wt % bleached cellulose fibres, and 5 wt % aluminium oxide particles was scattered over the digital print. The powder overlay was sprayed with water based micro drops comprising a release agent and dried with IR lamp in order to prevent a "blow out" of powder during the pressing operation.

The WPP board with the decorative surface and the balancing layer was pressed in a conventional direct lamination hot—hot press under a heat of 160° C. and with 20 bar pressure during 20 seconds to a floor blank with a water proof core comprising thermoplastic material and a stain and wear resistant digitally printed surface layer comprising a thermosetting resin.

The floor blank was after cooling to room temperature cut into individual floor panels and the edges were formed with an angling locking system on the long edges and a fold down system on the short edges comprising a separate flexible tongue that allows locking with vertical displacement, angling and horizontal snapping.

The invention claimed is:

1. A building panel comprising a core and a surface layer, wherein the core comprises a mix of thermoplastic material and wood particles,
wherein the surface layer comprises a composite material comprising wood particles bonded to each other by a cured thermosetting resin,
wherein the surface layer is bonded to the core by the cured thermosetting resin, and
wherein at least some of the wood particles of the core are not completely covered.

2. A building panel as claimed in claim 1, wherein the thermosetting resin is an amino resin.

3. A building panel as claimed in claim 1, wherein the surface layer further comprises thermoplastic particles.

4. A building panel as claimed in claim 1, wherein the thermoplastic material of the core comprises polyvinyl chloride, polypropylene, or polyethylene.

5. A building panel as claimed in claim 1, wherein the surface layer comprises thermoplastic particles with a size of about 0.2 mm or less.

6. A building panel as claimed in claim 1, wherein the wood particles of the surface layer have an average size that is smaller than an average size of the wood particles of the core.

7. A building panel as claimed in claim 1, wherein the building panel is a floor panel.

8. A building panel as claimed in claim 1, wherein one pair of opposite edges is formed with a mechanical locking system comprising a protruding strip and wherein the protruding strip comprises wood particles and thermoplastic material.

9. A board comprising an upper part possessing an upper surface, a lower part possessing a lower surface, and an intermediate portion located between the upper part and the lower part, wherein the intermediate portion comprises wood particles embedded in a thermoplastic material, and wherein the upper part comprises thermoplastic material and essentially raw wood particles adapted to bond to a thermosetting resin, the intermediate portion having a higher amount of the thermoplastic material than the upper part.

10. A board as claimed in claim 9, wherein the essentially raw wood particles protrude beyond the upper surface.

11. A board as claimed in claim 9, wherein the thermoplastic material comprises polyvinyl chloride, polypropylene, or polyethylene.

12. A board as claimed in claim 9, wherein the average size of the essentially raw wood particles at the upper surface is about 0.1-1.0 mm.

13. A building panel as claimed in claim 1, wherein the surface layer comprises two layers arranged above each other, and wherein an upper layer of said two layers comprises bleached cellulose fibres and thermosetting particles.

14. A building panel as claimed in claim 1, wherein the content of the wood particles in the core is in the range of about 30-80 wt %.

15. A building panel as claimed in claim 3, wherein the thermoplastic material is comprised in the powder mix of the surface layer and comprises thermoplastic particles, wherein the thermoplastic particles have an average size of about 0.2 mm or less.

16. A building panel comprising a core and a surface layer,
wherein the core comprises a mix of thermoplastic material and wood particles,
wherein the surface layer comprises a composite material comprising wood particles bonded to each other by a cured thermosetting resin,
wherein the surface layer is bonded to the core by the cured thermosetting resin, and
wherein the core comprises an intermediate layer and an upper layer, and wherein the intermediate layer comprises a higher amount of thermoplastic material than the upper layer.

17. A building panel as claimed in claim 16, wherein the intermediate layer further comprises limestone particles.

18. A building panel as claimed in claim 1, wherein the surface layer comprises a transparent wear layer comprising a thermosetting resin, wear resistant particles, and cellulose fibres.

19. A building panel as claimed in claim 18, wherein the thermosetting resin of the transparent wear layer is an amino resin.

20. A board as claimed in claim 9, wherein the essentially raw wood particles protrude beyond the lower surface.

21. A building panel comprising:
a core comprising a mix of thermoplastic material and wood particles,
a surface layer bonded to the core, the surface layer comprising wood particles, thermoplastic material, and a cured thermosetting resin, the wood particles being bonded to each other by the cured thermosetting resin, the thermoplastic material being thermoplastic particles that are spaced apart from one another and surrounded by the bonded wood particle,
the surface layer being bonded to the core by the cured thermosetting resin, and
at least some of the wood particles of the core being not completely covered by the thermoplastic material of the core to directly contact the cured thermosetting resin of the surface layer after the surface layer is bonded to the core.

22. The building panel according to claim 1, wherein an upper surface of the core is formed by the thermoplastic material, the upper surface of the core comprising the wood particles that are not completely covered.

23. The building panel according to claim 1, wherein at least some wood particles of the core protrude beyond an upper surface of the core formed by the thermoplastic material into the surface layer.

24. The building panel according to claim 22, wherein the surface layer is bonded to the upper surface of the core by the cured thermosetting resin.

25. A building panel comprising:
a core comprising a mix of thermoplastic material and wood particles;
a surface layer comprising wood particles bonded to each other by a cured thermosetting resin;
the surface layer being bonded to the core by the cured thermosetting resin of the surface layer; and
at least some of the wood particles of the core being not completely covered by the thermoplastic material of the core to directly contact the cured thermosetting resin of the surface layer after the surface layer is bonded to the core.

* * * * *